United States Patent Office 3,473,039
Patented Oct. 14, 1969

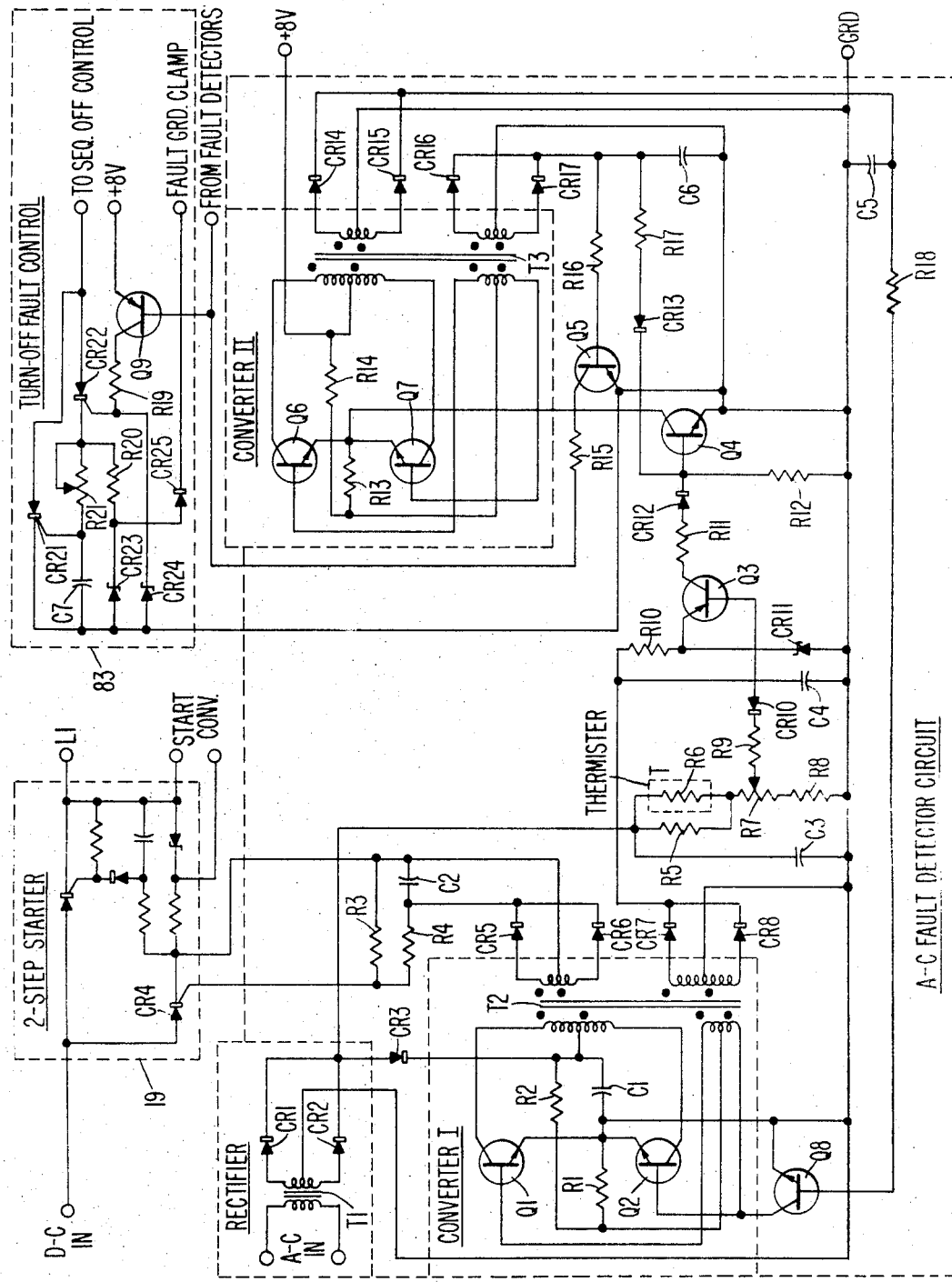

3,473,039
REGULATED POWER SYSTEM
Albert P. Fegley, Birchrunville, Pa., assignor to Burroughs Corporation, Detroit, Mich., a corporation of Michigan
Filed Feb. 16, 1966, Ser. No. 527,841
Int. Cl. H02j 1/00, 3/00
U.S. Cl. 307—11                 18 Claims

ABSTRACT OF THE DISCLOSURE

Improved regulated power systems for the supply of regulated electric power or operating voltages to electrical apparatus or systems, including high frequency converters and regulating elements which control the portion or width of the output pulses provided to the apparatus by the power system for regulating the voltages supplied thereto.

---

This invention relates to the supply of regulated electric power for electrical apparatus or systems. The invention more specifically relates to the conversion, regulation and control of electric power for supplying operating voltages in electronic data processing systems.

In the development of improved electrical systems such as compact electronic computers, for example, it has become increasingly desirable to reduce the size and weight and to increase the efficiency of the power systems which are utilized for supplying the regulated operating voltages. Reduction in the size and weight of power systems is important in apparatus intended to be installed in airborne vehicles and in portable equipment intended to be used in the field test or control of such vehicles, including missiles. High efficiency is important for reducing the generation of heat in the power system which can damage its components and which must under many circumstances be dispersed or absorbed by the use of forced cooling or refrigeration apparatus.

The size and weight of power systems for electronic equipment can be markedly reduced by the elimination of the bulky power transformers which are customarily utilized. The efficiency of such power systems is best reduced by decreasing the absorption of energy in the regulating element employed. In one method for improving such power systems, square wave generators or converters operating at relatively high fixed frequencies have been connected to series regulating elements, eliminating customary power transformers. In this type of power system the regulating element controls the width of the square wave pulses which are supplied to the load to effect regulation of the output voltages. A disadvantage of this type of power system is that it exhibits a generally slow response in compensating for transients and other abruptly occuring disturbances in the system. Such power systems also required a large amount of filtering of the regulator output which greatly increased the size of the power system. The increase in efficiency in this system is generally limited as a result of the regulating elements being operated at relatively low output voltage levels.

Another type of power system avoiding the use of power transformers has employed a frequency variable square wave generator including a multivibrator, the frequency of which is varied in response to the detection of variation in the output voltage levels in order to effect regulation of the same. This type of power system also proved to require considerable filtering and to exhibit generally slow response times. The filters utilized in such power systems and the controls required for regulating or varying the frequency of the oscillator or vibrator proved to result in a bulky and heavy power system. This system also exhibited a slow response time to transients.

Another method for increasing the efficiency of power systems has been to employ a switching type regulator in combination with power transformers. In some of these power systems semiconductor controlled rectifiers or transistors are utilized as a series regulating element which is alternately switched between full conduction and cut-off in response to detection of variations in the output supply voltage levels. These systems exhibit relatively slow response to transients and other abrupt disturbances in the system. Switching regulator power systems which incorporate line frequency power transformers are, moreover, bulky and heavy and are restricted to a limited range of frequencies of A-C power. The efficiency of this system is also limited as a result of the regulation being effected at relatively low output voltage levels rather than at higher input voltage levels.

Accordingly, it is an object of the subject invention to provide a small light-weight and highly efficient power system which is suitable for use with a data processor system or other electronic apparatus.

Another object of the subject invention is to provide a small light-weight power system which will rapidly respond to output voltage transients and abrupt disturbances in order to be suitable for use with electronic data processing apparatus.

A further object of this invention is to provide a highly efficient power system for use with electronic data processing systems which is capable of rapid response to transients and other abrupt disturbances in the output supply voltages and is capable of operating from A-C input power of a wide range of frequencies.

A still further object of this invention is to reduce the size and weight of power systems for electronic apparatus by eliminating the use of power transformers, to increase the efficiency of operation thereof and at the same time maintain rapid response to voltage variations in the system.

In accordance with these objects a power system is provided comprising a series transistor switching regulator including voltage reference and sensing means for rapidly and efficiently switching the series regulator transistor in response to variations in output voltages is connected in combination with a high frequency D-C to D-C converter for providing output voltages to electronic loads which are efficiently regulated. The voltage regulator and sensing means comprises a voltage referenced differential amplifier having a positive feedback circuit connected between its output and input which responds to variations in the output level of the converter.

The transistor switching regulator and the D-C to D-C converter are each supplied with starting signals originating from two-step starter means incorporating gated semiconductor means connected in series with the regulator and having signal delay means connected in circuit with its control gate. A voltage break-down reference device is coupled across the semiconductor means for initiating operation of the regulator and converter at a low level before the firing of the semiconductor means. Also in combination with said regulator and D-C to D-C converter is a starting converter of higher frequency than said D-C to D-C converter for receiving the starting voltage level from the two-step starter means and delivering a starting voltage level to said regulator and a square wave starting signal to the D-C to D-C converter.

The power system of the invention may further be connected in combination with a novel temperature variable series regulator at an output of the D-C to D-C converter for providing a supply voltage which decreases in magnitude with increase in temperature at a remote location in an electronic system to which the power supply may be connected. In further combination in said power system voltage sequence means may be connected in series with an output voltage from said converter including signal delay means and gated semiconductor means for delaying the application of said voltage to a load for a preselected period of time and for removing said voltage from the load upon detection of over or under voltage or over temperature conditions in the output supply voltages of the power system.

In another embodiment of the invention a power system comprises a transistor voltage switching regulator connected in combination with a high frequency D-C to D-C converter, each receiving starting voltage signals from two-step starter means connected to a rectifier for receiving input A-C power and being coupled to A-C fault detector means. This system monitors the input A-C voltage level, inhibiting operation of the two-step starter means upon detection of an A-C input voltage fault and thereby disconnecting input power from the switching regulator transistor. Said A-C fault detector means comprises a rectifier and first and second converter means, one of which produces an output under nominal input A-C voltage levels and the other of which alternatively conducts upon the detection of a fault in the input A-C power level until the input power decreases to a level which no longer will sustain its operation. Said other converter means is also connected to control means for providing an inhibit signal to a load apparatus for inhibiting its operation upon detection of a fault in the input A-C power level.

A feature of the subject invention resides in the utilization of two-step starter means which automatically begins to apply a reduced starting or initiating signal for a preselected period of time to the switching regulator and to the D-C to D-C converter imediately upon receiving full input power. The power system, therefore, automatically restarts upon reapplication of input power following input voltage failures or discontinuities. There is no requirement for manual operator intervention for restarting the power system after an input power failure since the two-step starter means reinitiates operation of the power system upon reappearance of nominal input voltage levels.

A further feature of this invention is the increased efficiency of operation of the power system as a result of the use of a single high voltage switching regulator for regulating a plurality of output voltage levels. The use of a single switching transistor regulator is enabled by connection of the regulator directly to the D-C to D-C converter transformer. The use of a single transistor regulator operated as a switching regulator minimizes its consumption of power in the power system in which it is employed.

These and other objects and features of the subject invention will be better understood by reference to the following illustrative detailed description of the invention, when read with reference to the accompanying drawings in which:

FIGURE 6 is a detailed schematic circuit diagram of the A-C fault detector means of the invention.

Figure 1:
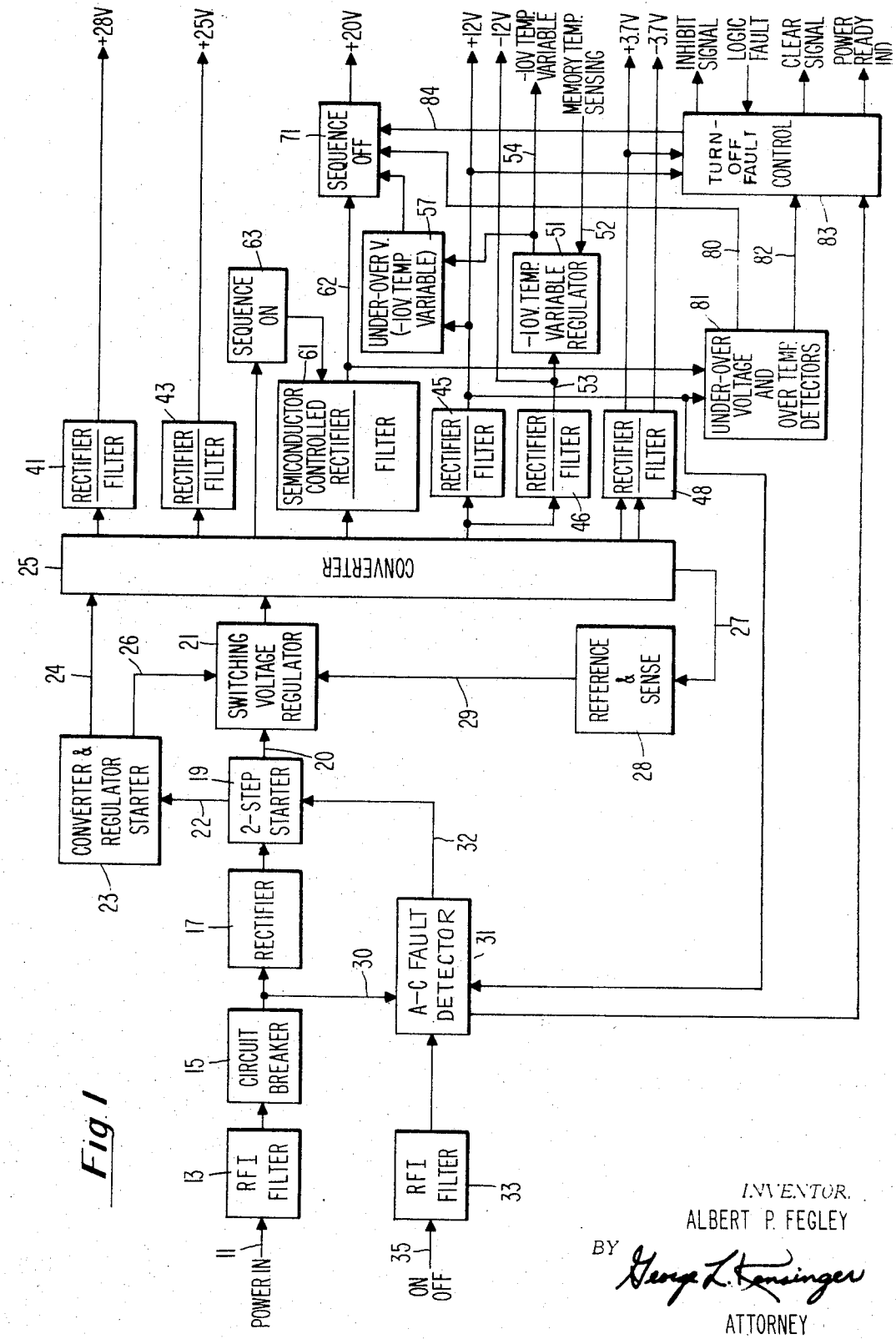
FIGURE 1 is a schematic block diagram of a power supply system in accordance with the subject invention.

Referring to FIGURE 1 a block diagram of a power supply system is illustrated having A-C input power applied at terminal 11 for delivering regulated output voltages from rectifier-filters 41, 43, 45, 46, 48 and the combination semiconductor controlled rectifier and filter 61 to electronic apparatus such as an electronic data processing system. Input power applied at terminal 11 passes radio frequency interference filter 13 and is delivered to circuit breaker 15 which limits input current to the power system and may be utilized as an on-off switch. The input A-C power from circuit breaker 15 is applied to rectifier 17 which in the preferred embodiment is a full wave rectifier for supplying direct current voltages to switching voltage regulator 21 through two-step starter 19. The two-step starter applies a reduced starting voltage to switching regulator 21 through conductor 20 and to converter and regulator starter 23 through conductor 22 during an initial predetermined period of time.

Converter and regulator starter 23 delivers a starting voltage level to switching voltage regulator 21 through conductor 26 and delivers a square wave starting signal to converter 25 through conductor 24, while receiving a starting voltage level on input conductor 22. The starting square wave delivered to converter 25 over conductor 24 causes the converter to begin oscillating and producing output voltages to rectifier-filters 41, 43, 45, 46, 48 and the combination semiconductor controlled rectifier and filter 61 as well as developing a voltage on conductor 27 which is connected to reference and sense unit 28 which has its output connected to control the switching voltage regulator 21 through conductor 29.

At the termination of the first preselected period of time by two-step starter 19, the starting voltage level to converter and regulator starter 23 is removed and full D-C input voltage is applied to switching regulator 21 over conductor 20 and delivered thereby to converter 25 for supplying the output voltages from the output rectifier-filters. Switching voltage regulator 21 operates to compensate for variations in output voltages from converter 25 by sensing the magnitude of the output level of converter 25 in the reference and sensing means 28. This unit responds to increases or decreases in the output level with respect to a fixed voltage reference and transmits a signal representative of output voltage variations to switching voltage regulator 21 via conductor 29.

Also connected to the output of circuit breaker 15 is A-C fault detector 31 through conductor 30. Fault detector 31 monitors the level of A-C input voltage to the power system through conductor 30 and delivers an inhibit signal to two-step starter 19 over conductor 32 if the input A-C voltage decreases below a preselected reference magitude. If desired, an off-on control 35 may be connected to the A-C fault detector 31 through a radio frequency interference filter 33 for providing an alternate low voltage and low current on-off switch for the power system.

As previously mentioned, output voltages are supplied from the rectifier-filters connected to the output of D-C to D-C converter 25. Rectifier-filters 45 and 46 have a common connection to an output terminal of converter 25 and supply opposite voltage polarities for the twelve volt output. The minus twelve volt output level from rectifier-filter 46 is supplied over conductor 53 to minus ten volt temperature variable regulator 51 which also receives an input over conductor 52 of a signal representative of an external temperature reading such as a memory temperature in an electronic data processing system to which the system may be connected. This temperature variable regulator 51 produces a temperature variable minus ten volt output signal over conductor 54 which is supplied to under-over voltage detector 57 as well as to the load. The plus twelve volt output level from rectifier-filter 45 is also connected to under-over voltage detector 57 as a bias voltage. In the preferred embodiment temperature variable regulator 51 provides an output voltage the magnitude of which decreases as the temperature at some remote sensing location increases. Under-over voltage detector 57 monitors the output of temperature variable voltage regulator 51 and produces a control signal which it delivers to sequence off control means 71 when the output of the temperature variable regulator falls below or rises above the preselected under-over voltage limits respectively.

The semiconductor controlled rectifier and filter 61 is connected to the output of converter 25 for supplying a plus twenty volt output level to a load. This output voltage is delivered to the sequence off control circuit 71 by conductor 62, which operates as a ground clamp for the plus twenty volt output level when caused to function. The operation of controlled rectifier and filter 61 is under control of sequence on control circuit 63 which delays its operation by a preselected period of time to enable all of the other voltage levels to reach their nominal value before the plus twenty volt supply voltage is permitted to rise to its prescribed level. Sequence on control circuit 63 includes a delay means for delaying turn-on of controlled rectifier-filter 61.

The plus twenty volt output from controlled rectifier and filter 61 and the plus twelve volt output from the rectifier-filter 45 are each supplied to under-over voltage and over temperature detectors 81 which monitor the level of these voltages as well as environmental temperature for shutting down the power system should either the voltage or temperature vary out of tolerance. Upon detection of an over tolerance voltage or temperature condition by detectors 81 a disconnect signal is delivered to sequence off control circuit 71 through conductor 80 for removing the twenty-volt output from the load device and a signal is delivered to control unit 83 over conductor 82 for delivering an inhibit signal to the load apparatus for preventing further operation or computing by the apparatus.

The inhibit signal delivered to the load apparatus by control unit 83 may be utilized for protecting and storing memory information in an electronic data processing system to which the power system is connected. The control unit 83 may also receive a logic fault signal from an electronic load apparatus for terminating supply of the plus twenty volt output level by sending a signal to sequence off control circuit 71 over conductor 84. The operation of sequence on control 63 delays the rise of the plus twenty volt output until the other supply voltages are at their nominal value, and sequence off control 71 which clamps to ground the plus twenty volt output upon occurence of an output failure before any of the other output voltages disappear excepting one that may have been shorted to ground also enables the protection of information stored in memory in electronic data processing systems to which the power system may be connected.

Figure 2:
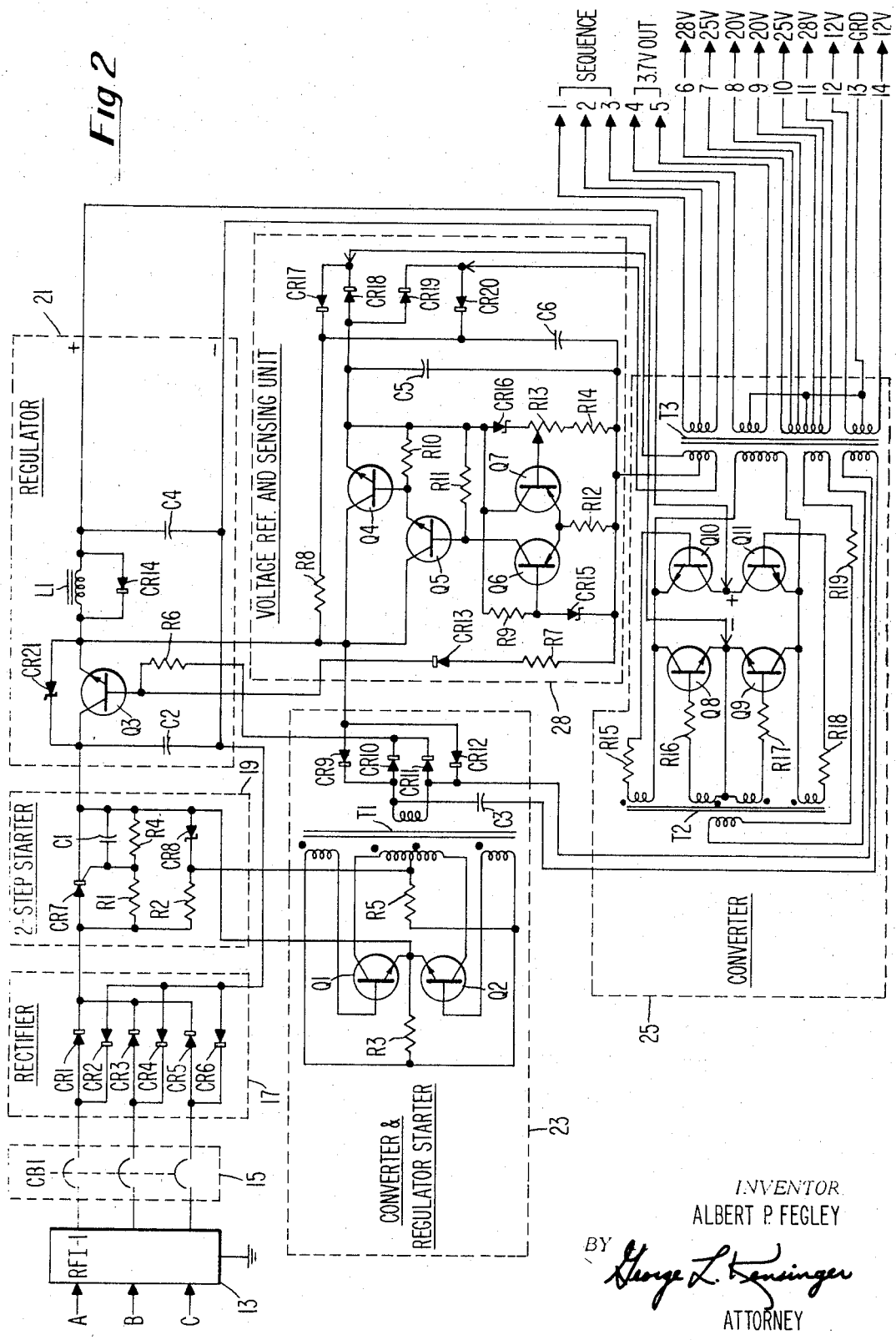
FIGURE 2 is a schematic circuit diagram illustrating a three-phase embodiment of the voltage regulating portion of the power system shown in FIGURE 1.

FIGURE 2 illustrates a schematic circuit diagram for a power system in accordance with the subject invention for receiving three phase A-C input power at points A, B and C and delivering regulated A-C supply voltages on terminals 4 through 14 and sequence control signals on terminals 1 to 3. In the preferred embodiment, the power system was designed to accept 120/208 volts A-C, —20% +60%, three phase, 20 to 1,000 cycles per second input power. The input power passes through a three phase interference filter RFI-1. This filter 13 is for attenuating high frequency transient voltages generated by either the power source or the load. The filter does not alter the performance of the power system. A three phase circuit breaker CB1, designated 15, is used for input current protection for the power system and may utilized as an on-off switch. Except for circuit breaker 15, all active system components are solid state devices. The input power passes through the circuit breaker and is applied to rectifier 17 which incorporates rectifiers CR1 through CR6 connected in a three phase full wave configuration. When operated from a typical three phase grounded neutral power source, the rectifier output cannot be grounded without causing circuit breaker 15 to open. The rectified output of CB1 is, therefore, allowed to float. In the preferred embodiment the nominal rectified voltage is 280 volts D-C.

The D-C output of rectifier 17 is applied to two-step starter circuit 19 which reduces the intial turn-on current surge by nearly one-half for preventing the stressing of components, reducing the transient load on the power source and allowing the circuit breaker to have a lower current rating. The two-step starter is comprised of a semiconductor controlled rectifier CR7 having resistor R1 connected from its anode to its gate and having capacitor C1 and resistor R4 connected in parrallel between its gate and cathode. Series connected resistor R2 and voltage breakdown device CR8 which may be a Zener diode, are connected from the anode to the cathode of controlled rectifier CR7. Resistor R2 and reference diode CR8 carry the initial current surge. Diode CR8 is used to provide a nearly constant voltage during the starting surge for operating the converter and regulator starter circuit. The combination of resistor R2 and reference diode CR8 limit the initial current surge. Resistor R1 and capacitor C1 form an RC time constant to delay the firing of controlled rectifier CR7.

When the voltage across C1 reaches a sufficient level, CR7 will switch on and essentially short circuit the circuit branch including resistor R2 and reference diode CR8 in series and a second turn-on surge occurs. The design goal is to make the first and second turn-on surges approximately equal. Once controlled rectifier CR7 is turned on, it will remain on until circuit breaker 15 is opened or the regulator turns off because of a short circuit across the converter output. Resistor R4 is used as a bias resistor between the gate and cathode of the controlled rectifier to prevent false firing of the controlled rectifier upon the occurence of transient voltages between the anode and cathode. The voltage drop across CR7 when turned on and therefore across the circuit branch including resistor R2 and reference diode CR8 is approximately one volt.

The converter and regulator starter 23 obtains its input D-C voltage level from a cross reference diode CR8 of the two-step starter 19. This voltage is present for only a short preselected period of time (approximately 100 milliseconds in the preferred embodiment). During the application of this voltage to the converter and regulator starter, the oscillator composed of transformer T1, transistors Q1 and Q2 and resistors R3 and R5 oscillates at a high frequency, (approximately 80 to 100 kilocycles per second in the preferred embodiment). Resistor R3 limits the base current to transistors Q1 and Q2. Resistor R5 is for completing a circuit path for the flow of starting current in the oscillator. The frequency of the oscillator is determined by the time required to saturate transformer T1. During the operation of the oscillator transistors Q1 and Q2 are in opposite states, saturated or unsaturated.

The square wave output of the oscillator is rectified by diodes CR9 through CR12 and applied to the base of the series regulating transistor Q3. This rectified square wave signal is current limited by resistor R6 through which it is coupled to the base of transistor Q3. Resistor R6 is selected to insure that the regulator is started by the application of the starting square wave signal and to prevent voltage overshoot during turn-on of the regulator. The square wave output of the oscillator is also capacitor coupled by capacitor C3 to a winding of transformer T3 which forms a part of the converter circuit 25. When this pulse power is applied to transformer T3 through capacitor C3 and a winding thereon, the converter begins to operate. Capacitor C3 is selected to have enough capacitance to insure the starting of converter 25. The frequency of the converter and regulator starter 23 is designed to be very high (approximately 100 kc.) in comparison to the frequency of converter 25 (approximately 2 kc. per second in the prefrred embodiment) so that the capacitor coupling from the starter to the converter is considerably more effective than that from the converter back to the starter. This insures that the starter will cause only a small loss affecting the converter when the converter is operating.

The switching voltage regulator comprises the voltage reference an sensing unit 28 and the switching regulator 21. The voltage reference and sensing unit receives the unregulated A-C voltage from a winding on transformer T3 of converter 25 and switches regulator 21 for regulating the input voltage before it appears across the converter input and develops voltages on the output supply busses. Sensing is accomplished across a separate winding on the converter transformer in order to insure isolation from the output voltages applied to the load which are referenced to ground since the input power to the regulator is desired to be floating or not grounded. The square wave output of converter transformer T3 is full wave rectified by rectifiers CR18 and CR19 to supply a negative sense of driver voltage and by rectifiers CR17 and CR20 for supplying a positive bias voltage from the same winding. Capacitors C5 and C6 filter the outputs of these two rectifier circuits.

Reference diode CR15 is used to establish a reference voltage for the switching regulator. Reference diode CR16 is used to minimize voltage attenuation of the sensed voltage variations at the base of transistor Q7. Potentiometer R13 allows the output of the regulator to be adjusted to a desired level. Resistors R9 and R14 establish the bias curents for CR15 and CR16 respectively. Transistors Q6 and Q7 form a differential amplifier circuit which aids in maintaining voltage regulation stability over a wide temperature range. Transistors Q4 and Q5 are connected in cascade with transistor Q5 being provided a signal from transistor Q6. Resistors R10 and R11 are bias resistors to compensate for leakage currents of Q4 and Q5 respectivley. Resistor R12 limits the maximum current through transistors Q6 and Q7 and consequently to transistors Q4 and Q5 as well.

Transistor Q4 drives transistor Q3 through resistor R7 which limits the current and through diode CR13 which protects transistor Q3 from reverse voltages across the base to emitter junction. Reference diode CR21 is connected from the collector to emitter of transistor Q3 for protecting that transistor from forward voltage breakdown when the transistor is not conducting. Inductor L1 is connected in series with the transistor Q3 for limiting the current therethrough. Diode CR14 prevents the voltage of the emitter of Q3 from going dangerously far negative with respect to its collector which could exceed the maximum $V_{CE}$ of the transistor when Q3 is turned off and inductor L1 produces a high reverse voltage inductive surge. Capacitors C2 and C4 are utilized for filtering the voltages appearing across the regulator input and output respectively.

Transistor Q3 turns on when the voltage across the output of converter transformer T3 decreases in magnitude and turn off when this voltage goes high in magnitude. Switching therefore usually occurs with each cycle of the rectified square wave output from converter transformer T3. When the voltage across capacitor C5 decreases in magnitude, the base current of transistor Q7 decreases and Q7 collector current decreases as well. Since the current through resistor R12 is essentially constant, a decrease in transistor Q7 collector current results in an increase in transistor Q6 collector current. An increase in the collector current of transistor Q6 results in an increase in the collector currents of transistors Q5 and Q4. An increase in the collector current of transistor Q4 causes the negative voltage across capacitor C5 to decrease in magnitude still further, thus causing the collector current of Q4 to increase still further. This positive feedback or regenerative action causes transistor Q4 to switch on very rapidly which in turn rapidly switches Q3 on. If on the other hand the voltage across capacitor C5 increases in magnitude, the base current of transistor Q7 starts to increase which results in a decrease in the collector currents of transistors Q6, Q5 and Q4, and a further increase in the voltage across capacitor C5. The regenerative or positive feedback action then causes transistor Q7 to switch on fully very rapidly which in turn rapidly causes transistor Q3 to switch off. None of the components of the voltage reference and sensing unit 28 or the regulator 21 are grounded, these two circuits which comprise the switching regulator remaining floating with respect to ground as does the entire input portion of the power system.

Converter 25 receives an A-C input voltage from converter and regulator starter 23 and provides several high frequency A-C square wave outputs. In the preferred embodiment the frequency of operation of converter 25 is approximately 800 to 1000 cycles per second in order to reduce the required size of transformers T2 and T3. This frequency is determined or established by the period of time required to saturate transformer T2 which is connected in circuit with the transistors Q8 to Q11. When transistors Q8 and Q11 are turned on, transistors Q9 and Q10 are turned off and vice versa. A transistor bridge configuration is used because of the high D-C input voltage to the converter as a result of the use of three phase 208 volt A-C input power supply to the power system in the preferred embodiment. The bridge configuration reduces the collector to emitter voltage seen by the transistors to one-half the value which would appear thereacross in a standard two transistor converter such as is utilized in the converter of the single phase input power system shown in FIGURE 3. Returning to FIGURE 2 resistors R15 through R18 limit the base current to the respective transistors. Resistor R19 aids the regenerative switching action which causes the transistors to switch. A short circuit across the output of the converter will cause transformer T3 to saturate and the converter therefore to stop oscillating without stressing any components. When the converter turns off the regulator also will turn off without causing circuit breaker 15 to open. Upon shutdown of the power system by a voltage failure or fault in the output or within the converter or regulator it is necessary to open and then reclose circuit breaker CB1 to restart the system.

Figure 3:
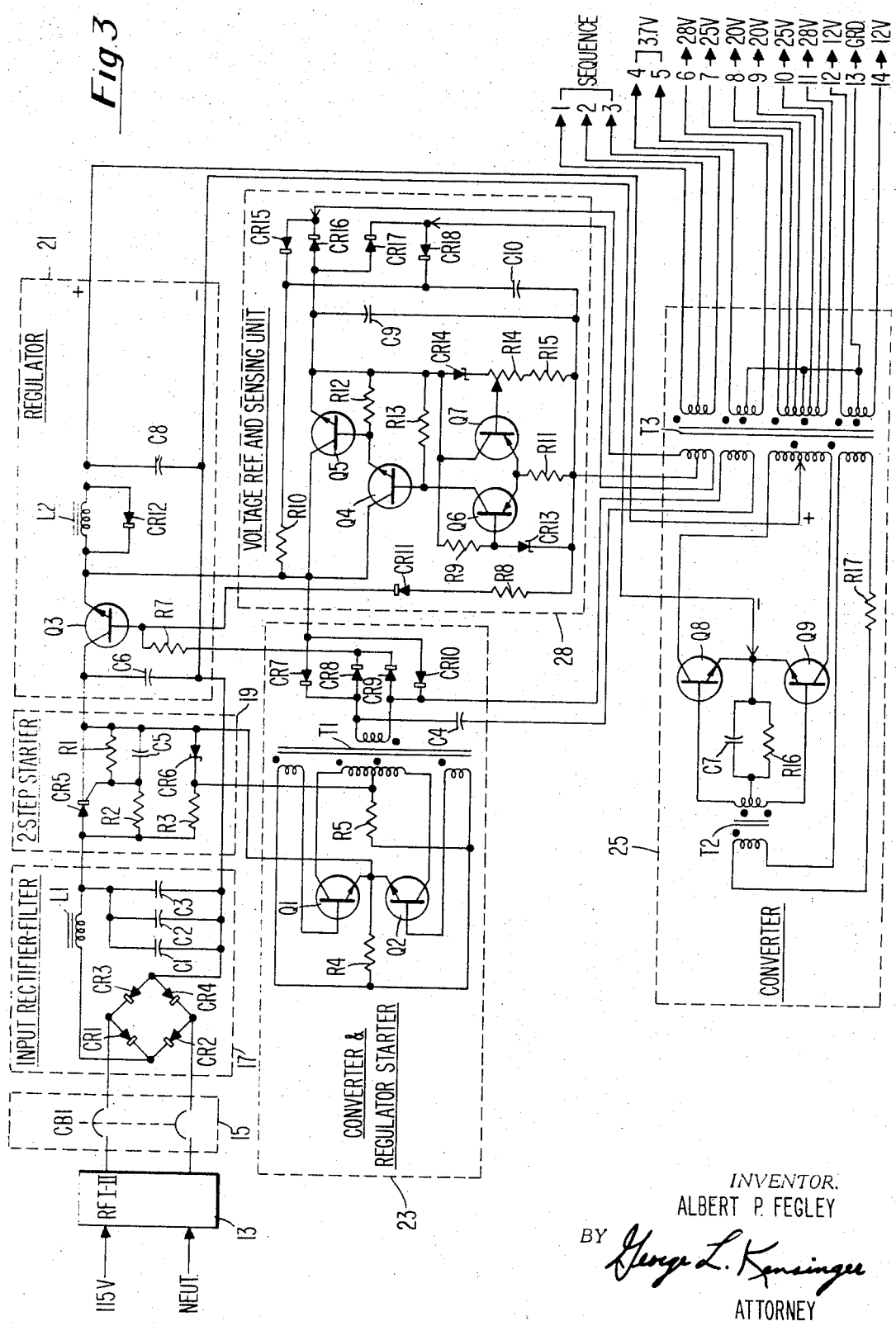
FIGURE 3 is a schematic circuit diagram of a single phase embodiment of the voltage regulating portion of the power system illustrated in FIGURE 2.

FIGURE 3 illustrates a schematic circuit diagram of a power system in accordance with the subject invention for receiving single phase input A-C power at the input terminals of radio frequency interference filter 13 and delivering regulated A-C output voltages on terminals 4 through 14 and sequence control signals on terminals 1 to 3. The single phase input power supply system of FIGURE 3 is very similar to the three phase input power system illustrated in FIGURE 2 except that the single phase input power system requires an input filter and can be provided with a simpler converter circuit as a result of the lower input voltages involved. The theory of operation otherwise is the same for both the three phase and the single phase input power systems.

In the single phase A-C input power configuration of FIGURE 3 it is necessary to utilize a filtering circuit for reducing the ripple across the output of input rectifiers CR1 to CR4 which form a full-wave rectifier bridge for the single phase A-C voltage. The filter circuit consists of inductor L1 and the parallel combination of capacitors C1 through C3. Transistor Q3 of the regulator circuit in this single phase power system can have a lower collector to emitter voltage rating due to the reduced input voltage levels but requires a higher current rating to supply the same load as a three phase input system. Also, because of the lower voltages in single phase systems, it is unnecessary to provide in them a protective reference diode across the collector to the emitter of the regulating transistor for protection against excessive forward voltages.

The converter circuit in the single phase power system requires only two transistors Q8 and Q9 because of the lower D-C input voltage of the single phase system as compared with the three-phase system. A single resistor R16 is used to limit the base current of transistors Q8 and Q9. Capacitor C7 aids in achieving fast switching of transistors Q8 and Q9 in the converter circuit. Capacitors C6 and C8 in regulator 21 of the single phase input power system may have a lower voltage rating but requires a higher current capacity than the equivalent capacitors in the three-phase system. The single phase system also requires one less section in the interference filter 13, one less pole on the circuit breaker 15 and two fewer input rectifiers than the three-phase system. The current ratings of the interference filter, circuit breaker, and rectifier circuits are higher for the single phase circuit, also, as compared with the three-phase power system of equal output power rating. The single phase system is generally slightly larger than the three-phase system because of the greater filtering and larger filtering circuits required in single phase systems.

Figure 4:
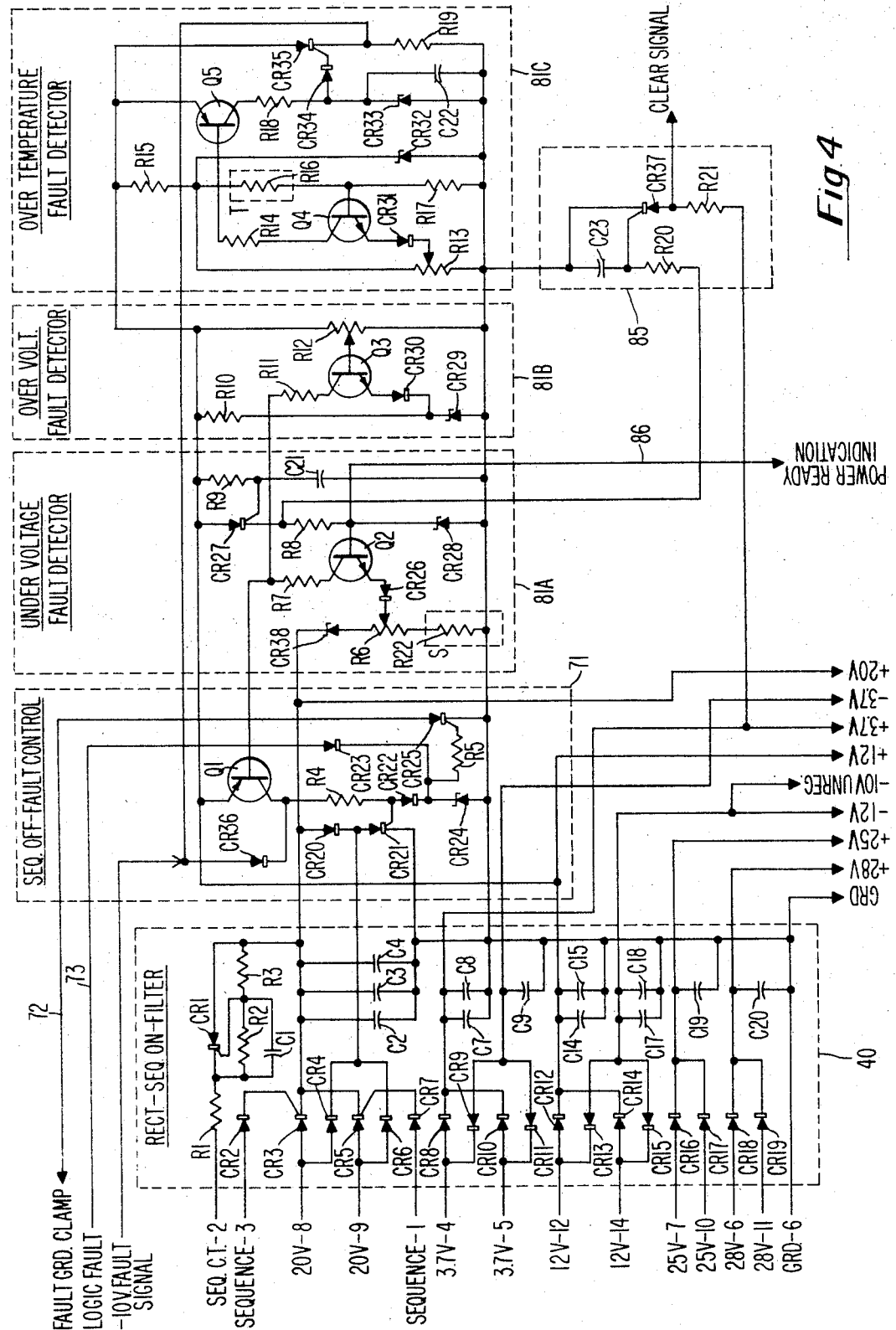
FIGURE 4 is a schematic circuit diagram of the voltage sequencing control and output fault responsive means of the subject invention.

In FIGURE 4 is shown the output rectifier-filters and the combination semiconductor controlled rectifier and filter which are connected to converter 25 along with the sequence on control, designated 40, sequence off control 71, and under voltage fault detector 81a, over voltage fault detector 81b, over temperature fault detector 81c, and clear signal generator 85. The square wave outputs of convertor transformer T3 shown in FIGURE 3 are rectified and capacitor filtered by apparatus such as that of FIGURE 4 to produce D-C voltages with relatively low ripple (less than 300 millivolts in the preferred embodiment).

In both the single phase and three phase embodiments, the converter and regulator starter continuously pulses the D-C to D-C converter and applies a starting voltage level to the switching regulator coextensive with the duration of the starting signal provided by the two-step starter. The continuous application of starting pulses to the D-C to D-C converter assures that the converter will begin operating, whereas a single pulse could fail to initiate the converter. The application of a voltage level to the switching regulator for starting it is important so that the regulator is enabled coincidentally with the starting of the convertor which is necessary for initiating operating of the power system. In the circuits operated, the converter was continuously pulsed and a voltage level applied to the switching regulator for a period of time between 5 and 300 millisecond. In addition to the coincident enabling of both the converter and the regulator for a period of time sufficient to assure initiation of power system operation it is also important that the convertor and regulator starter does not overshoot in magnitude or duration in application of starting signals to the converter and regulator. A voltage or current surge could stress components and an overly extended starting signal duration could interfere with rapid shut-down of the system which conditions may require.

A center tapped full-wave rectifier configuration is used for the majority of the voltages in order to decrease the number of rectifiers, decrease the voltage drop in the rectifier circuits and thereby reduce power losses in addition to improving the regulation of voltage levels, and to reduce the number of secondary windings on transformer T3. The rectifier circuit incorporates rectifiers CR8 through CR19. Rectifiers and controlled rectifiers CR2 through CR7 are associated with the sequence circuits and also perform rectification of the twenty volt output. Capacitors C2 to C4, C7 to C9, C14, C15 and C17 to C20 are utilized for filtering the rectified outputs of the converter.

The sequencing of the output voltages during turn-on requires a delay in the application of the twenty volt output until a period has elapsed during which the other voltage levels rise to their prescribed levels. This is accomplished by delaying the turn-on of controlled rectifiers CR3 and CR5 which set as both rectifiers and switches. The R-C charging time constant of resistor R3 and capacitor C1 provide the delay in turn-on of the CR3 and CR5. When the voltage across C1 is high enough to fire controlled rectifier CR1 then the sequencing windings of converter transformer T3 are switched across the gate to cathode terminals of controlled rectifiers CR3 and CR5. Since these windings have square wave outputs, one or the other of CR3 and CR5 will turn-on depending upon the polarity of the winding voltage. Once CR1 turns on it remains on and controlled rectifiers CR3 and CR5 switch on and off alternately as a result of the sequencing winding and twenty volt output winding polarities. It is to be noted that the semiconductor controlled rectifier sequencing circuit is employed in the present invention to permit the elimination of the use of diodes for rectifying the twenty volt output of the converter since it rectifies as well as delays that converter output. The semiconductor controlled rectifiers in that circuit therefore, perform the two-fold functions of gating and delaying a square wave output of the converter as could be effected upon any A-c or pulsating electrical signal. Diodes CR2 and CR7 protect the gate to cathode junctions of controlled rectifiers CR3 and CR5 respectively from destructive reverse voltages. Diodes CR2 and CR7 also act as rectifiers for maintaining a D-C voltage across controlled rectifier CR1 and thus maintaining its conduction once it has received the initial gate firing voltage. Resistor R1 limits the current to the gates of both controlled rectifiers CR3 and CR5. Resistor R2 is a bias resistor that aids in preventing false firing of controlled rectifier C1 due to the transient voltages on the anode and cathode. In the power system that was built, operated and tested, the voltage drop across controlled rectifiers CR1, CR3 and CR5 when turned on, was approximately one volt each.

The sequencing of the output voltages during a normal turn-off of the power system is accomplished by the sensing of a low voltage on the twenty volt output and a consequent firing of controlled rectifier CR21 to clamp the twenty volt output to ground. Additional controlled rectifiers equivalent to CR21 may also be utilized for clamping other of the voltage supplies to ground as well or instead. During a turn-off resulting from an output voltage fault, controlled rectifier CR21 will cause the twenty volt output to be clamped to ground potential before the other voltages decay to ground with the exception of any of the output voltages which may have been physically shorted to ground or shorted to ground as a result of component failure. In the circuit shown in FIGURE 4 an under voltage fault, an over voltage fault, and an over temperature fault or under voltage fault on the minus ten volt temperature variable supply will cause the twenty volt output level to sequence off first.

Rectifiers CR4 and CR6 permit shut-down of the power system without waiting for the twenty volt output to sequence on if a fault condition such as an over voltage occurs during turn-on of the first sequenced voltages. Rectifier CR20 is a blocking diode to prevent the twenty volts available from diode CR4 and diode CR6 from reaching the twenty volt output buss when controlled rectifiers CR3 and CR5 are not conducting. Rectifier CR36 is a blocking diode for assuring that all of the current that passes through transistor Q1 of the fault detection circuit also passes through resistor R4 which is utilized for limiting the current to the gate electrode of controlled rectifier CR21. Rectifier CR22 and reference diode CR24 limit the voltage between the gate and cathode of controlled rectifier CR21 to a safe level and reference diode CR24 protects controlled rectifier CR25 by limiting its gate to cathode voltage. Diode CR22 also acts as a blocking diode which permits a signal to appear on fault ground clamp line 72 when controlled rectifier CR21 is fired in addition to clamping the twenty volt output to ground. Diode CR22 also assures that a signal received from the load apparatus on the logic fault line 72 activates only the fault ground clamp line 72 and does not clamp the plus twenty volt output supply to ground.

In the circuit which was operated and tested the response time of controlled rectifier CR21 to a firing signal was less than two microseconds. The firing of controlled rectifier CR21 caused the twenty volt output line to be clamped to approximately two volts within fifty microseconds, rectifier CR20 accounting for part of this voltage drop. While the twenty volt output was clamped to ground in approximately fifty microseconds, all the other output voltages decayed considerably more slowly, most requiring several hundred microseconds, to decay. The firing of controlled rectifier CR21 after the R-C circuit connected therewith is charged causes the converter transformer T3 to saturate which causes the converter to stop oscillating without stressing any components.

An under voltage condition in the power system output is sensed across the twenty volt output subject to delay of the R-C time constant circuit formed by resistor R9 and capacitor C21. As the voltage across C21 increases to a sufficient level, the controlled rectifier CR27 will fire which renders the undervoltage sensing circuit operative. Reference diode CR28 establishes a reference voltage and resistor R8 biases this reference diode. Reference diode CR38 is used to reflect the twenty volt output voltage changes to the emitter of transistor Q2. Potentiometer R6 adjusts the low voltage sensing level and R2 is a sensor which compensates for temperature drift in diode CR26 and transistors Q2 and Q1 by increasing its resistance as the temperature increases. Resistor R6 and sensistor R22 establish a current through reference diode CR38. Diode CR26 protects the emitter-base junction of transistor Q2 from dangerous reverse voltages. Resistor R7 limits the current to transistor Q2 and the base of transistor Q1. As the twenty volt output supply drops transistor Q2 at some point depending upon the setting of potentiometer R6, begins to saturate. When this occurs, transistor Q1 also begins to saturate and at some further point controlled rectifier CR21 of the sequence off control circuit will fire. Transistor Q1 isolates the fault detector circuits from one another and increases the circuit gain so that reference diodes of low current capacity can be utilized.

The over voltage sensing circuit senses for over voltage faults across the plus twelve volt output. The over voltage sensing circuit is operative at all times. Its operation is not delayed, but it is otherwise similar in operation to the under voltage sensing circuit. Since the over voltage sensing point is less critical than the under voltage sensing point, no provision is made to compensate for temperature drift. Reference diode CR29 establishes a reference voltage against which the output is compared. Resistor R10 is a bias resistor for controlled rectifiers CR29 and potentiometer R12 adjusts the over voltage sensing level. Diode CR30 protects the emitter to base junction of transistor Q3 against damaging reverse voltages. Transistor Q3 starts to saturate as its base voltage rises in response to a rise in the output voltage on the plus twelve volt supply. Resistor R11 limits the current through transistor Q3 and the base of transistor Q1 which also forms a part of the under voltage circuit. When transistor Q3 saturates, transistor Q1 also saturates and causes controlled rectifier CR21 to fire for clamping the twenty volt output to ground.

The over temperature fault detector circuit is similar to the under voltage sensing circuit and additionally incorporates a controlled rectifier CR35 which operates as a switch to prevent an accumulative effect of a slight increase in temperature with nominal variations in the voltage outputs. For example, a high temperature and below normal voltage will not, therefore, react to cause the sequencing off circuit to be any more or any less sensitive to fault detection than if only a high temperature were present. Thermistor R16 decreases in resistance as the temperature increases. Resistor R17 acts as a bias resistor for thermistor R16 and forms a voltage divider circuit therewith. The setting of potentiometer R13 determines the point at which over temperature will be sensed. Diode CR31 prevents the emitter-base junction of transistor Q4 from being destroyed by high reverse voltages.

As the temperature rises transistor Q4 begins to saturate. Resistor R14 limits the current to transistor Q4 and the base of transistor Q5 which provides isolation to the gate of controlled rectifier CR35 and also contributes to circuit gain. Resistor R15 is a bias resistor for reference diode CR32 which insures that output voltage variations will not significantly affect the over temperature sensing point. Resistor R18 limits the current to the gate of controlled rectifier CR35 and reference diode CR33 limits the maximum gate to cathode voltages from damaging CR35. Capacitor C22 prevents transient voltages and noise from firing controlled rectifier CR25 and resistor R19 limits the current through CR35 and insures that it will remain turned on once fired by a signal on its gate. The output of controlled rectifier CR21 of the sequencing off circuit for clamping the twenty volt output to ground upon detection of an over temperature fault.

The control circuit includes sequence off fault control 71, clear signal generator 85 and control lines for receiving either a logic fault or a minus ten volt regulator fault signal and for providing a fault ground clamp signal and a power-ready indication. A logic fault signal which originates in a load connected to the power system is provided for activating the fault ground clamp circuit only whereas a minus ten volt fault signal is designed to activate both the fault ground clamp as well as to clamp the twenty volt output supply to ground. A sequence off signal in one of the fault detectors will also activate the fault ground clamp in addition to clamping the twenty volt output to ground. Diode CR23 is a blocking diode for preventing the sequence off signal to the fault ground clamp from being seen by the logic fault circuit. Resistor R5 limits the current to the gate of controlled rectifier CR25 the function of which is to clamp to ground certain logic circuits in an electronic load. When CR25 is turned on by a signal on its gate, the voltage drop across its anode and cathode is approximately one volt for most available controlled rectifiers.

A clear signal is generated upon the turn-on of the 3.7 volt output and disappears upon the turn-on of controlled rectifier CR37 which clamps the clear signal line to within approximately one volt of ground. Resistor R21 limits the current through controlled rectifier CR37 when fired and resistor R20 and capacitor C23 form an R-C time delay circuit for delaying the turn-on of controlled rectifier CR37. Resistor R20 also limits the current to the gate of CR37. As the voltage across capacitor C23 increases, a point is reached at which controlled rectifier CR37 will fire. No voltage is applied to this R-C time constant circuit until the under voltage fault sensing circuit 81a is activated. The power-ready indication which is provided on output line 86 is also dependent upon the activation of under voltage fault sensing circuit 81a. The power-ready indicator itself may be a low voltage D-C lamp which is activated by a signal from the output line 86.

Figure 5:
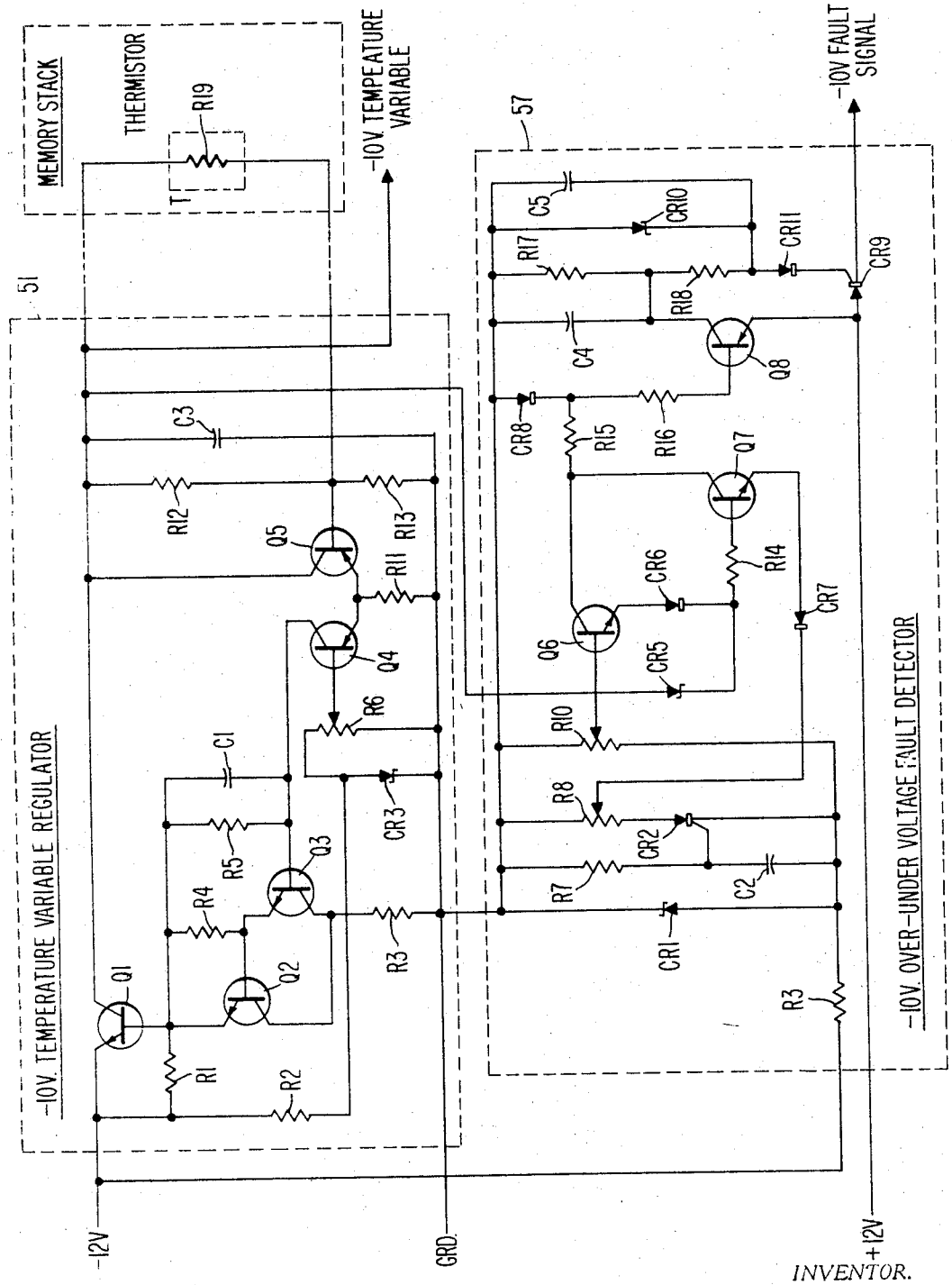
FIGURE 5 is a schematic circuit diagram of a temperature variable series regulator for use in the power system of the invention.

FIGURE 5 is a schematic circuit diagram of a novel temperature variable regulator 51 and over-under voltage fault detector 57. The output of the illustrated minus ten volt regulator 51 is designed to drift with temperature such that its voltage magnitude increases as the temperature at some remote location increases. In the circuit designed and constructed in accordance with the invention, the temperature coefficient achieved was 0.0345 volt per degree centigrade temperature change. Temperature sensing is done by the regulator from thermister R19 located in the memory stack of an electronic data processing system load, for example. As the resistance of the thermistor decreases with an increase in temperature, the output voltage of the regulator decreases. The output voltage change is proportional to the voltage change across parallel resistors R12 and R19, which constitute the sensing portion of the circuit. Resistor R13 is a bias resistor for the sensing combination of resistor R12 and which causes thermister R19 to operate along the most R19 and may be chosen to have a value of resistance linear portion of its characteristic by controlling the current therein and the voltage across the thermistor.

Reference diode CR3 provides a temperature stable voltage reference against which the output voltage may be compared. Potentiometer R6 is provided for adjusting the output voltage level. Resistor R22 allows the regulator to start by initiating conduction in transistor Q4 and also serves as a bias resistor for reference diode CR3 and resistor R6. Resistor R11 limits the current through the differential amplifier incorporating transistors Q4 and Q5. The use of a differential amplifier circuit also compensates for the effects of temperature upon the regulator circuit including the transistors in the reference and sensing circuit. Transistors Q2 and Q3 are connected in cascade for amplifying the signal from transistor Q4. The series transistor Q1 amplifies the signal from transistor Q2. Resistors R1, R4 and R5 are bias resistors for transistors Q1, Q2 and Q3 respectively. These resistors compensate for transistor leakage currents that increase with an increase in temperature. Resistor R3 limits the current in transistor Q2 and in the base of transistor Q1 and thus also limits the maximum output current. Capacitor C1 is used to assure frequency stability and capacitor C3 is utilized for reducing ripple and for improving the response time of the circuit to transient loads.

A low voltage across the regulator output causes the voltage at the base of transistor Q5 to go toward ground. This results in a decrease of the emitter current of transistor Q5 and causes the emitter current of transistor Q4 to increase, the current through resistor R11 being essentially constant. An increase in the base current of transistor Q1 will cause that transistor to conduct more fully and result in an increase in output voltage for thereby compensating for the detected low output voltage level.

The minus ten volt under-over voltage protection circuit 57 assures that malfunctions across the minus ten volt temperature variable output will not go undetected. Reference diode CR1 establishes a temperature stable voltage reference for this fault detector. Resistor R3 is a bias resistor for controlled rectifier CR1 in the voltage reference portion of the circuit. Resistor R7 and capacitor C2 form an R-C time constant for delaying under voltage sensing of this minus ten volt temperature variable output. Resistor R7 also limits the current to the gate of controlled rectifier CR2, the firing of which activates the under voltage reference circuit. Potentiometer R8 is used for adjusting the under voltage sensing point. Potentiometer R10 is used to adjust the over voltage sensing point and to limit the current to the base of transistor Q6. Diodes CR6 and CR7 are for protecting transistors Q6 and Q7 respectively, from damaging reverse voltage on their base to emitter junctions. Resistor R14 limits the current to the base of transistor Q7 and resistor R15 limits the current to the collectors of transistors Q6 and Q7. Diode CR8 and resistor R16 insure current limiting at the base of transistor Q8. Capacitors C4 and C5 prevent the false sensing of a fault condition which could result from voltage transients or noise. Resistor R17 is for bleeding the leakage current of transistor Q8 to ground for preventing that leakage current from firing controlled rectifier CR9. Resistor R18 limits the gate current of controlled rectifier CR9 and diode CR10 limits the gate to cathode voltage of CR9 to a safe value by blocking current flow through transistor Q8 and resistor R18. When an under voltage condition occurs in the minus ten volt temperature variable supply after the activation of the under voltage sensing circuit, transistor Q7 will begin to saturate. This results in the saturating of transistor Q8 as well and causes the firing of controlled rectifier CR9 which provides the minus ten volt signal which is used to fire controlled rectifier CR21 in the sequence off control circuit 71 illustrated in FIGURE 4. In the operation of a circuit constructed in accordance with this fault detector, the period of time which elapsed between the occurrence of a fault on the temperature variable output until the firing of controlled rectifier CR21 in the sequence off circuit was less than 4 microseconds.

The over voltage sensing circuit is operative at all times at which the minus ten volt temperature variable regulator operates. Resistor R10 serves as the over voltage sensing means and transistor Q6 is caused to conduct when an over voltage occurs just as resistor R8 serves as the sensing means for an under voltage condition and transistor Q7 conducts when an under voltage condition occurs. The operation of the over voltage sensing circuit is similar to the operation of the under voltage sensing circuit and provides a signal for saturating transistor Q8 and firing controlled rectifier CR9 for the consequent firing of controlled rectifier CR21 in the sequence off circuit.

The A-C fault detection circuit of FIGURE 6 is designed to sense low A-C input voltages provided to the power system output as a result of the low A-C input inhibit operation of memory circuits in electronic load apparatus connected thereto and to turn off the power system. The circuit is designed so that the memory inhibit signal occurs before the power system begins to sequence off and before a low voltage condition arises across the power system output as a result of the low A-C input voltage. The A-C fault detection circuit is completely solid state and may be used with single phase or three-phase power by modification of transformer T1 and the associated rectifier circuits. In the operational circuit the memory inhibit signal was produced at least 15 microseconds before the power system began to sequence off or produce a low voltage output and the overall response time of the circuit to an A-C fault was approximately 20 microseconds. It should be noted that with the minor addition of an additional detector transistor circuit analogous to the transistor Q3 detector circuit, over voltage sensing of the A-C input power could be also achieved in this fault circuit.

The A-C fault detection ciricuit utilizes transformer T1 to step down the input A-C voltage for improving the efficiency of the sensing circuit and reducing the voltages applied to the transistors therein, particularly transistors Q1 and Q2 of converter I. The efficiency is also improved thereby as a result of minimizing power dissipation in the resistor voltage divider circuit consisting of resistors R5, R6, R7 and R8. Rectifiers CR1 and CR2 form a full-wave center-tapped rectifier across the secondary of transformer T1. Resistors R5, R6, R8 and potentiometer R7 form a voltage divider sensing circuit across the rectified output of transformer T1. R6 is a thermistor for compensating for temperature drift in the components of the voltage sensing and reference circuit. Potentiometer R7 enables adjustment of the A-C under voltage sensing point. Capacitor C3 maintains the instantaneous voltage across the voltage divider circuit from decreasing below a minimum predetermined level when A-C input voltage is applied across the primary of transformer T1. Capacitor C1 reduces ripple in the voltage across the input to the converter and rectifier CR3 prevents capacitor C1 from affecting the voltage across the voltage divider sensing circuit.

Transformer T2 and transistors Q1 and Q2 form a converter circuit designated "converter I." Resistor R1 limits the current to the base of transistors Q1 and Q2 in converter I and resistor R2 provides a starting current path for the same. Rectifiers CR5 and CR6 form a full-wave center-tapped rectifier and capacitor C2 filters the output of the rectifier. Resistor R4 limits the current to the gate of controlled rectifier CR4 which is connected in the firing control circuit for the controlled rectifier of the illustrated two-step starter which is otherwise identical to the two-step starter previously described. Controlled rectifier R4 acts as a switch for the application or removal of power to the power system regulator and converter circuits. Resistor R3 aids in preventing false turn-on of controlled rectifier CR4 by allowing leakage current to bypass the gate to cathode junction thereof.

Rectifiers CR7 and CR8 form a full-wave center-tapped rectifier and capacitor C4 rectifies the output thereof. Reference diode CR11 provides a reference voltage against which the rectified A-C input voltage may be compared. Resistor R10 establishes the bias current through reference diode CR11. Resistor R9 limits the current in the base of transistor Q3 and rectifier CR10 prevents stressing of the emitter to base junction of transistor Q3 which could result from reversed voltages thereacross. Transistor Q3 saturates when the voltage at the A-C sensing point established by resistors R5, R6, R7 or R8 is below the voltage of the reference point established by reference diode CR11.

Resistor R11 limits the current to the base of transistor Q4. Rectifier CR12 prevents reverse current through the collector of transistor Q3. Resistor R12 is a bias resistor which insures that leakage currents do not cause transistor Q4 to saturate. When transistor Q3 saturates transistor Q4 will saturate and apply voltage across the converter II formed by transformer T3 and transistors Q6 and Q7. Resistor R13 limits the current in the base of transistors Q6 and Q7. Resistor R14 provides a starting current path for converter II. Rectifiers CR14 and CR15 form a full-wave center-tapped rectifier whose output is filtered by capacitor C5.

Resistor R18 limits the current in the base of transistor Q8. When transistor Q8 saturates converter I formed by transformer T2 and transistors Q1 and Q2 will stop operating.

Rectifiers CR16 and CR17 form a full-wave center-tapped rectifier whose output is filtered by capacitor C6. Resistors R16 and R17 limit the current to the base of transistors Q5 and Q4 respectively. Rectifier CR13 prevents current from the collector of transistor Q3 from appearing at the base of transistor Q5.

When converter II formed by transformer T3 and transistors Q6 and Q7 turns on, resulting from the saturation of transistors Q3 and Q4, converter I formed by transformer T3 and transistors Q1 and Q2 will turn off. Transistor Q4 however, will remain saturated so long as there is sufficient power to maintain operation of converter II. When converter I turns off, transformer T2 will unsaturate and controlled rectifier CR4 will stop conducting, thus removing power from the switching regulator input terminal. When converter II turns on, transistor Q5 will saturate. Resistor R15 limits the current through the collector of transistor Q5 and also in the base of transistor Q9 located in the control circuit. When transistor Q5 saturates, transistor Q9 will also saturate and start the power system turn-off sequence.

When transistor Q9 saturates, controlled rectifier CR22 will turn on and produce the memory inhibit signal, and also result in the R-C time constant delayed turn on of controlled rectifier CR21. The turn on of controlled rectifier CR21 results in the clamping of the twenty volt output to ground which in turn results in the removal of all output voltages from the power system. Reference diode CR24 limits the gate to cathode voltage of controlled rectifier CR22 to a safe value and resistor R19 limits the current to the gate of CR22. Resistor R20 establishes the bias current through reference diode CR23 which establishes a voltage reference for the memory inhibit signal. Potentiometer R21 and capacitor C7 form an adjustable R-C time constant circuit to delay the turn on of controlled rectifier CR21. Rectifier CR25 prevents the memory inhibit circuit in the load apparatus from inducing a voltage in the control circuit.

Each of the converters utilized in the invention, including the converter and regulator starter, have a saturable transformer having windings connected to at least a pair of transistors to form an oscillator in which the transistors conduct alternately while a starting signal is applied to the oscillator. It should be noted that other active conducting devices such as vacuum tubes could be utilized in place of the transistors.

There has been described herein an illustrative power system which exemplifies the subject invention. For details of the manner of use of the power system of the subject invention with electronic data processing apparatus as a load, reference is made to the copending United States patent application entitled Interface Control Module for Modular Computer System and Plural Peripheral Devices, Ser. No. 527,350, filed by Hans B. Marx, on Feb. 14, 1966, and assigned to the same assignee as the present application. It is important also to note that the power system of the subject invention may be operated from an unregulated D-C input power source as from an A-C input power source in which case the input rectifiers could be eliminated and the A-C fault detector would not be utilized.

Obviously, many modifications and variations of the present invention are possible in the light of the above teachings. It is therefore to be understood that within the scope of the appended claims the invention may be practiced otherwise than as specifically described.

I claim:

1. A power system for receiving electric power at an input terminal and providing a plurality of regulated output voltages comprising:
    a D-C to D-C converter comprising a saturable transformer having winding means coupled to at least a pair of active elements to form an oscillator in which the active elements conduct alternately during the application of a voltage level across them upon receiving a starting signal, output rectifying means coupled to said oscillator, and a plurality of output terminals;
    a switching voltage regulator comprising series regulating means coupled to said input terminal for providing a voltage level to said converter, voltage sensing means for switching said regulating means between conduction and non-conduction response to variation of the voltage on a sense terminal coupled to an output terminal of said converter; and
    starting means coupled to said input terminal and coupled for providing a starting signal to said converter oscillator and for initially biasing said regulating means into conduction.

2. The power system of claim 1 in which said voltage sensing means comprises a voltage reference device and an amplifier having an input circuit biased by said reference device and coupled to said sense terminal, an output circuit coupled to said regulating means, and having positive feedback means connected between the output and input circuits thereof.

3. The power system of claim 2 wherein said amplifier is a differential amplifier having first and second input terminals, said first input terminal being connected to said voltage reference device, said second input terminal being coupled to said sense terminal, and said positive feedback means being coupled between the second input terminal of said amplifier and said output circuit.

4. A power system for receiving electric power at an input terminal and providing a plurality of regulated output voltages according to claim 1 wherein said starting means is a second D-C to D-C converter comprising a second saturable transformer having winding means coupled to a pair of active elements to form an oscillator in which the active elements conduct alternately while receiving a voltage level from said input terminal and a rectifier is coupled to the second converter output terminal and to said regulating means for initially biasing the regulating means into conduction.

5. A power system for receiving electric power at an input terminal and providing a plurality of regulated output voltages according to claim 1 in combination with a two-step starter comprising a semiconductor controlled rectifier having a gate terminal and voltage breakdown reference means each coupled between the power system input terminal and the series regulating means, capacitive means connected between the gate terminal and another electrode of said controlled rectifier, and resistance means connected between the gate terminal and the third electrode of said controlled rectifier, the starting means being connected across the voltage reference means of said two-step starter.

6. The power system of claim 5 wherein the starting means is a second D-C to D-C converter comprising a second saturable transformer having winding means coupled to a pair of active elements to form an oscillator in which the active elements conduct alternately while receiving a voltage level from across the voltage reference means of said two-step starter and a rectifier is coupled to the second converter output terminal and to said regulating means for initially biasing the regulating means into conduction.

7. The power sytem of claim 5 in combination with gate means connected between said system input terminal and the gate terminal of the semiconductor controlled rectifier and having a control circuit, and A-C fault detector means comprising a third D-C to D-C converter coupled for receiving operating voltage from the input terminal and having a rectified output connected to said gate control circuit, and voltage referenced amplifying means coupled to the input terminal and to said third converter for interrupting the system operation when the input voltage varies a prescribed amount from a reference voltage magnitude.

8. In a power system for receiving electrical power at a set of input terminals and generating a plurality of output voltages, the combination comprising:
first D-C to D-C converter means comprising a saturable transformer and at least a pair of semiconductor devices each having a control circuit and an output circuit coupled to said transformer to form an oscillator having a first fixed frequency of oscillation, the output circuits being electrically connected to said input terminals, said transformer having a plurality of rectified output windings and a starting winding;
starting D-C to D-C converter means comprising a second saturable transformer and at least a pair of semiconductor devices each having a control circuit and an output circuit coupled to said second transformer to form a second oscillator having a fixed frequency of oscillation higher than said first frequency, its output circuits being electrically connected to said input terminals, said second transformer having an output winding; and
means electrically connected between said output winding of the starting converter means transformer and said starting winding of the first D-C to D-C converter means transformer.

9. In a power system for receiving electrical power at a set of input terminals and generating a plurality of of output voltages, the invention of claim 8 in combination with a two-step starter comprising a semiconductor controller rectifier having a gate terminal and voltage breakdown reference means each coupled between an input terminal and the output circuits of the first D-C to D-C converter means semiconductor devices, capacitive means electrically connected between the gate terminal and another electrode of said controlled rectifier, and first electrical resistance means connected between the gate terminal and the third electrode of said controlled rectifier; the output circuits of the starting converter semiconductor devices being connected across the voltage reference means of said two-step starter means.

10. The invention of claim 9 in combination with gate means electrically connected between said set of input terminals and the junction of the voltage reference means and the first resistance means and A-C fault detector means comprising third D-C to D-C converter means coupled for receiving operating voltage from the input terminals and having a rectified output connected to the gate means control terminal, and comparator means coupled to said input terminals and to said third converter for rendering inoperative said third converter when a prescribed voltage difference arises between the input voltage level and a reference voltage magnitude.

11. The combination of claim 10 wherein the gate means is a second semiconductor controlled rectifier, the gate terminal of which is the control terminal; and second electrical resistance means is connected between the second controlled rectifier and the voltage breakdown reference means.

12. A power system for supplying a regulated output voltage from electric input power comprising:
a solid state switching regulator comprising a series regulating transistor electrically connected for receiving said input power and voltage referenced control means having a sense terminal and an output terminal connected to the transistor for switching said transistor into saturation when the voltage at said sense terminal decreases below a preselected reference magnitude, said voltage referenced control means having regeneratively coupled amplifying means electrically connected between said sense terminal and said regulating transistor,
D-C to D-C converter means for said input power comprising a fixed frequency oscillator having a control terminal and an output terminal and rectifying means coupled between said oscillator output terminal and the sense terminal of said control means, and
starting means for applying a starting signal to the oscillator control terminal.

13. A power system for supplying a regulated output voltage from electric input power according to claim 11 wherein the voltage referenced control means comprises a transistor differential amplifier connected between a voltage breakdown reference device and the sense terminal and the starting means initially biases the regulating transistor into conduction coincidentally with applying a starting signal to the oscillator control terminal.

14. The power system of claim 12 in combination with a temperature variable series regulator comprising a second series regulating transistor connected between the converter rectifying means output terminal and a variable voltage output terminal, a thermistor for sensing temperature having one end electrically connected to said variable voltage output terminal, and a transistor amplifier connected to second voltage reference means and the other end of said thermistor and being connected to said second regulating transistor to vary its conductivity as the sensed temperature varies.

15. The power system of claim 12 wherein the converter oscillator has a plurality of output voltage terminal pairs and voltage sequencing means comprising first and second semiconductor controlled rectifiers each connected in series with a different one of a first pair of said output voltage terminals, the gate terminal of each being electrically connected to a second pair of output voltage terminals having voltages in phase with the voltages on said first pair, and electrical delay means connected in a return current path from the semiconductor controlled rectifiers to said converter oscillator.

16. In a power system including a switching regulator in combination with first D-C to D-C converter means and starter means for supplying a regulated output voltage from unregulated A-C input power, an A-C fault detector comprising:
rectifying means electrically connected to the unregulated A-C input voltage and having an output terminal;
gated D-C to D-C converter means coupled to said rectifier output terminal for receiving operating voltage therefrom and having a rectified output connected to control said starting means;

and voltage comparator means coupled to said rectifying means output terminal, to said first D-C to D-C converter means and to said gated D-C to D-C converter means for rendering said converter means inoperative when the A-C input voltage varies more than a preselected magnitude.

17. The A-C fault detector of claim 16 further comprising a third D-C to D-C converter means electrically coupled between said comparator means and said first D-C to D-C converter means, said third converter means commencing oscillation under control of said comparator means when the A-C input voltage varies more than the preselected magnitude and oscillates until the input power fails to sustain its operation.

18. The combination of claim 17 wherein the output of said third D-C to D-C converter means is further coupled to said gated D-C to D-C converter means for rendering the same inoperative when the A-C input voltage varies beyond more than the preselected magnitude.

References Cited
UNITED STATES PATENTS

| | | | |
|---|---|---|---|
| 3,327,199 | 6/1967 | Gardner et al. | 321—2 |
| 3,337,787 | 8/1967 | Joseph | 321—2 |

ROBERT K. SCHAEFER, Primary Examiner

H. J. HOHAUSER, Assistant Examiner

U.S. Cl. X.R.

321—2

PO-1050
(5/69)

UNITED STATES PATENT OFFICE
CERTIFICATE OF CORRECTION

Patent No. 3,473,039              Dated  October 14, 1969

Inventor(s)  Albert P. Fegley

It is certified that error appears in the above-identified patent and that said Letters Patent are hereby corrected as shown below:

Col. 5, line 61,      after "may" insert  --be-- .
Col. 6, line 74,      after "reference", "an" should read --and-- .
Col. 9, line 68,      "set" should read  --act-- .
Col. 10, line 24,     "C1" should read  --CR1-- .
Col. 12, last two lines, the order of the lines should be reversed, i.e., line 75 should come before line 74.
Col. 14, line 18,     after "system" delete the remainder of the line and insert therefor  --of the invention and to send a signal to-- .
Col. 20, line 3,      delete "beyond".

SIGNED AND
SEALED
MAY 26 1970

(SEAL)
Attest:

Edward M. Fletcher, Jr.
Attesting Officer

WILLIAM E. SCHUYLER, JR.
Commissioner of Patents